United States Patent [19]

Stewart et al.

[11] 4,287,092

[45] Sep. 1, 1981

[54] ACID CATALYSIS OF RESIN FOUNDRY BINDERS

[75] Inventors: Patrick H. Stewart; Wayne D. Woodson, both of Danville, Ill.

[73] Assignee: CL Industries, Inc., Danville, Ill.

[21] Appl. No.: 117,251

[22] Filed: Jan. 31, 1980

[51] Int. Cl.³ ............................................. B01J 31/02
[52] U.S. Cl. ................................ 252/429 R; 252/428; 260/38
[58] Field of Search ............................ 252/428, 429 R

[56] References Cited

U.S. PATENT DOCUMENTS

| | | | |
|---|---|---|---|
| 3,700,604 | 10/1972 | Metil | 252/428 |
| 3,976,595 | 8/1976 | Scott et al. | 252/428 |
| 4,028,271 | 6/1977 | Schaidle et al. | 252/429 R |

Primary Examiner—Patrick Garvin

Attorney, Agent, or Firm—Neal J. Mosely

[57] ABSTRACT

A method of producing sand cores or molds for foundry use involves coating the sand with a novel acid catalyst composition and adding acid-curing, condensation-type resin.

A novel acid catalyst composition comprises the mixture of a sulfonic acid such as benzene sulfonic acid, toluene sulfonic acid or xylene sulfonic acid, or mixtures thereof, with 0.5–20% wt. perchloric acid. A catalyst of this composition, when admixed with foundry sand and an acid-curing condensation-type resin, is a novel composition characterized by rapid cure and high tensile strength and hardness in the resulting resin-bound sand core or mold. Sand cores or molds made using this catalyst/sand/resin composition are further characterized by low emissions of oxidizable gaseous organic constituents.

6 Claims, No Drawings

ACID CATALYSIS OF RESIN FOUNDRY BINDERS

BACKGROUND OF THE INVENTION

1. Field of the Invention

This invention relates to new and useful improvements in the production of sand cores and molds for foundry use and more particularly to resin and catalyst compositions used in the manufacture of sand cores and molds.

2. Brief Description of the Prior Art

The preparation of sand cores and molds for use in foundry operations is a well developed art. In the past, a variety of binders have been used for the preparation of sand cores and molds. Most sand cores and molds today are made using various condensation-type organic resins. The condensation-type organic resins are thermosetting resins and are usually acid-curable, at least under some conditions. Phenolic resins, phenolic modified furan resins, furfuryl alcohol-urea-formaldehyde resins, furfuryl alcohol-formaldehyde resins and furfuryl alcohol-urea phenol-formaldehyde resins are typical of the resins that have been used in the preparation of sand cores and molds for foundry use.

The prior art dealing with thermosetting or condensation-type resins discloses a large number of acid catalysts that have been used for effecting a condensation-type polymerization of resin precursors or monomers. It has been found, however, that all of the acids which are capable of effecting condensation-type polymerization are not equally effective in the preparation of resin-bound sand cores or molds. In fact, many of the acids which are disclosed to be satisfactory catalysts for the curing of condensation-type resins are inoperative to produce satisfactory resin-bound sand cores or molds.

Catalysts which have been used in acid catalysis or acid curing of condensation-type resins include mineral acids such as sulfuric acid, hydrochloric acid, nitric acid, phosphoric acid, etc., simple organic acids such as formic acid, acetic acid, trichloroacetic acid, trifuluoroacetic acid, etc., and strong organic acids such as the aromatic sulfonic acids, viz. benzene sulfonic acid, toluene sulfonic acid, zylene sulfonic acid, etc.

In the preparation of sand cores and molds, the various mineral acids and the simple organic acids have proved unsatisfactory for a variety of reasons. The aromatic sulfonic acids have produced satisfactory sand cores or molds but usually require a rather substantial setting or curing time. The sulfonic acids also have the disadvantage that there is a substantial evolution of aromatic hydrocarbons in the emissions from metal casting operations using sand cores or molds where the aromatic sulfonic acids have been used as catalyst for the resin binders. Accordingly, there has been a substantial need for acid catalyst or curing agents for catalysis or curing of condensation-type resin binders for sand cores or molds which will cure in a shorter period of time than the sulfonic acids without substantial reduction in strength or hardness of the sand cores or molds produced using such resins.

SUMMARY OF THE INVENTION

One of the objects of this invention is to provide a new and improved method of producing sand cores and molds of relatively high strength in a shorter time period.

Another object of this invention is to produce improved sand cores and molds which are characterized by low emissions of volatile oxidizable organic compounds.

Another object of this invention is to provide new and improved molding compositions for the production of sand cores and molds.

Still another object of this invention is to provide new and improved methods for the production of molding compositions for use in the manufacture of sand cores and molds.

Still another object of this invention is to provide new and improved molding compositions utilizing improved acid catalysts.

Still another object of this invention is to provide new and improved acid catalysts for use in condensation polymerization of resins used in the production of sand cores or molds.

Still another object of this invention is to provide new and improved catalyst compositions containing aromatic sulfonic acids and perchloric acid and characterized by rapid cure in the polymerization of acid-curing condensation-type resins and further characterized by the production of resins having low volatile organic compound emissions when used in sand cores and molds.

Other objects of this invention will become apparent from time to time throughout the specification and claims as hereinafter related.

The above-stated objects are obtained by the formulation of catalyst compositions comprising a mixture of aromatic sulfonic acids, such as benzene sulfonic acid, toluene sulfonic acid, xylene sulfonic acid, etc, and 0.5–20% perchloric acid and the utilization of such catalyst in the curing or polymerization of condensation-type resins used in the production of sand cores or molds. Acid catalysts of this composition are characterized by producing a higher rate of cure without substantial reduction in hardness of sand cores or molds produced by admixture of condensation-type resins with sand and polymerization by admixture with an acid catalyst.

DESCRIPTION OF THE PREFERRED EMBODIMENTS

In understanding this invention, it is necessary to distinguish in the technical literature, viz. patent literature, technical publications, trade technical literature, etc., between thermal polymerization, acid curing or acid catalysis of resins, preparation of resins containing inert fillers, and preparation of sand cores or molds in which the resin is merely a binder.

Thermosetting resins or condensation-type resins have been known for more than 90 years. These resins include phenol-formaldehyde resins, urea-formaldehyde resins, furan resins, etc. These resins can be polymerized by application of heat and pressure. These resins can also be polymerized by acid curing or acid catalysis under certaian conditions. Condensation-type resins have been used in combination with inert fillers of various types wherein the fillers are used in amounts about equal to the amount of resin. Such compositions have been used in the manufacture of molded plastic products and such resin compositions have also been used as cements or binders for cementing floor tiles or joints or the like. In the manufacture of sand cores or molds, condensation-type resins have been used as binders to secure the sand particles together. In such applications, the resins have been used in a relatively small proportion in relation to the sand. Usually, only about 0.75–2.0% of the resin will be used calculated on the weight of the sand. The resin is therefore functioning strictly as a binder for the sand particles as distinquished from resin compositions wherein the inert material is a filler.

In the preparation of sand cores or molds, sand is mixed first with an acid catalyst and then with a condensation-type resin and allowed to cure. The acid must be added to the sand. The addition of the acid to the resin, at the high concentrations used, results in an extremely violent reaction.

The condensation-type resins used have been the furan resins, phenolic resins, urea-formaldehyde resins, phenolic modified furan resins, furfuryl alcohol-formaldehyde resins, etc. The furan resins have been used extensively in the manufacture of sand cores and molds and can be cured or catalyzed by a variety of acids including phosphoric acid and various aromatic sulfonic acids, sulfamic acid, etc. Phenolic resins are substantially less expensive than the furan resins and have achieved a substantial degree of commercial acceptance. The phenolic resins, however, have a relatively long curing time and are not cured by all of the acids that are used in the curing of furan resins for sand core or sand mold production. Similar problems are encountered in the acid curing of phenolic modified resins, furfuryl alcohol-urea-formaldehyde resins, furfuryl alcohol-formaldehyde resins and furfuryl-urea-formaldehyde-phenol resins.

In Examples I–V, below, there are disclosed typical examples of the use of various acids in curing phenolic resins in the preparation of sand cores or molds (or attempts to prepare sand cores or molds).

EXAMPLE I

A foundry grade sand is mixed with 40% sulfuric acid (1.0 N), calculated on the resin binder, as catalyst. The mixture is thoroughly mixed with a low viscosity, liquid phenol-formaldehyde resole resin in a concentration of 1.25% resin based on the sand. The sand/resin/catalyst mix is then formed into test biscuits and allowed to cure at a temperature of 75–80 degrees Fahrenheit. After 2 hours, the biscuits are not cured sufficiently to pick up without breaking. Similar results are obtained when attempts are made to form the sand/resin mix into sand cores or molds. When the concentration of sulfuric acid is increased to 60% wt., based on the resin, on the sand there is no appreciable improvement in curing of the resin cores.

EXAMPLE II

A foundry grade sand is mixed with 50% wt. hydrochloric acid (1.0 N), calculated on the resin binder, as catalyst. The mixture is thoroughly mixed with a low viscosity, liquid phenol-formaldehyde resole resin at a concentration of 1.25% resin based on the sand. The sand/resin/catalyst mix is then formed into test biscuits and allowed to cure at a temperature of 80 degrees Fahrenheit. After 2 hours, the biscuits are not cured sufficiently to pick up without breaking. Similar results are obtained when attempts are made to form the sand/resin mix into sand cores or molds. After a longer curing period, very weak sand cores are produced. When the concentration of hydrochloric acid on the sand is increased to 60% wt., based on the resin, there is no appreciable improvement in the curing of the resin. It has also been noted that resins cured with hydrochloric acid tend to evolve noxious fumes when heated, thus resulting in a serious environmental hazard.

EXAMPLE III

A foundry grade sand is mixed with 50% wt. phosphoric acid (1.0 N), calculated on the resin binder, as catalyst. The mixture is then mixed with a low viscosity liquid phenol-formaldehyde resole resin at a concentration of 1.25% resin based on the sand. The sand/resin/catalyst mix is then formed into test biscuits and then allowed to cure at a temperature of 80 degrees Fahrenheit. After 2 hours, the biscuits are not cured sufficiently to pick up without breaking. Similar results are obtained when attempts are made to form the resin/sand mix into sand cores or molds. When concentrated phosphoric acid is substituted as catalyst, there is a slight improvement in curing of the resin but a satisfactory cure is not obtained in less than 2 hours.

EXAMPLE IV

A foundry grade sand is mixed with 40% wt. nitric acid (1.0 N), calculated on the resin binder, as catalyst. The mixture is thoroughly mixed with a low viscosity, liquid phenol-formaldehyde resole resin at a concentration of 1.25% resin based on the sand. The sand/resin/catalyst mix is then formed into test biscuits and allowed to cure at a temperature of 80 degrees Fahrenheit. After 2 hours, the biscuits are not cured sufficiently to handle without breaking. Similar results are obtained when the sand/resin/catalyst mix is formed into sand cores or nolds. When the concentration of the nitric acid catalyst is increased to 60% wt., based on the resin, or when the concentration of nitric acid used is increased substantially, there is no appreciable improvement in the curing of the resin. The resin can be cured at a more elevated temperature but there is a strong tendency to evolve noxious fumes. When nitric acid catalyst is stored for long periods, there is a substantial evolution of nitrogen dioxide during use. The evolution of nitrogen dioxide is unacceptable environmentally.

EXAMPLE V

A foundry grade sand with 40–60% toluene sulfonic acid catalyst, calculated on resin binder. The catalyst consisted of 67% toluene sulfonic acid, 20% methanol and 13% water and mixes easily with the sand and resin.

The sand/catalyst mixture was then mixed with a liquid phenol-formaldehyde resole resin at a concentration of 1.25% resin based on the sand. The sand/resin/catalyst mix was then formed into test biscuits and allowed to cure at a temperature of 80 degrees Farenheit. After a curing period of 45–60 minutes, the test biscuits were set sufficiently to be handled without breaking. The test biscuits were tested after 2 hours, according to standard foundry procedures, for tensile strength of 180–200 psi and core hardness of 70–80, both of which are within acceptable limits for sand core and mold manufacture.

PREPARATION OF SAND CORES AND MOLDS WITH IMPROVED CATALYST COMPOSITIONS

The following examples disclose the preparation of improved catalyst compositions comprising aromatic sulfonic acids admixed with 0.5–20% perchloric acid. These examples illustrate the preparation of improved catalysts containing perchloric acid and the use of such catalysts in the acid curing of resins used in the preparation of sand cores and molds. The resins which benefit particularly from acid catalysts of this type include phenolformaldehyde resins, phenolic modified furan resins, furfuryl alcohol-urea-formaldehyde resins, furfuryl alcohol-formaldehyde resins and furfuryl alcohol-urea-formaldehyde-phenol resins. It is also noted that the use of perchloric acid-containing acid catalysts in the preparation of sand cores and molds has the further advantage of reducing pour off emissions when the sand cores and molds are used in foundry operations. At ambient temperatures and even at slightly elevated temperatures, perchloric acid is a non-oxidizing acid. At higher temperatures, perchloric acid becomes a very efficient oxidizer. When a casting is poured into or around a mold or core which has been prepared using a perchloric acid-containing catalyst, the perchloric acid in the polymerized resin acts as an oxidizer to oxidize volatile organic compounds in the emissions from the foundry operation. The oxidization of these emissions results in a substantial reduction in the environmentally objectable emissions.

EXAMPLE VI

A foundry grade sand was mixed with 55% wt., based on the resin binder, of a catalyst consistly of 67% toluene sulfonic acid modified by admixture therewith of 10% perchloric acid (70% concentration).

The sand/catalyst mixture was then mixed with a low viscosity liquid phenol-formaldehyde resole resin at a concentration of 1.25% resin based on the sand. The sand/resin/catalyst mix was then formed into test biscuits and allowed to cure at a temperature of 81 degrees Farenheit. After a curing period of 19 minutes, the test biscuits were set sufficiently to be handled without breaking. The test biscuits were tested after 2 hours, accordingly to standard foundry procedures for tensile strength and hardness. These test biscuits had tensile strengths of 178-185 psi and core hardness of 69-78, both of which are within acceptable limits for sand core and mold manufacture.

A control was run using a resin/sand/catalyst mixture of the same composition and at the same curing temperature but using a 67% toluene sulfonic acid catalyst without addition of perchloric acid. Under these conditions and using this cataylst, a curing time of 30 minutes was required to produce test biscuits having a tensile strength and hardness as great as that produced in 19 minutes using the perchloric acid-containing catalyst.

EXAMPLE VII

In the preparation of sand cores and molds using phenolic resins which are cataylzed by aromatic sulfonic acids, it is well known that the various aromatic sulfonic acids are not exactly equivalent to each other in operation. For example, benzene sulfonic acid is a much faster catalyst than toluene sulfonic acid. It is necessary to run toluene sulfonic acid at a substantially higher concentration to produce a cure in as short a time as can be obtained with a benzene sulfonic acid catalyst, however, is that these catalysts result in the evolution of benzene which is a toxic and environmentally unacceptable emission when the sand cores or molds are used in foundry operation. In this example, it is shown that a toluene sulfonic acid catalyst, modified by addition of perchloric acid, produces results equivalent to those obtained by the much stronger benzene sulfonic acid catalyst at the same catalyst concentration.

A foundry grade sand was mixed with 40% of a perchloric acid-containing toluene sulfonic acid catalyst. The catalyst composition consisted of 67% toluene sulfonic acid to which 10% perchloric acid (70% concentration) had been added. The catalyst mixed easily with sand and resin.

The sand/catalyst mixture was then mixed with a low viscosity liquid phenol-formaldehyde resole resin at a concentration of 1.25% based on the sand. The sand/resin/catalyst mix was then formed into test biscuits and allowed to cure at temperature of 79 degrees Farenheit. After a curing period of 33 minutes, the test biscuits were sufficiently set to be handled without breaking. The test biscuits were test after 2 hours, according to standard foundry procedures, for tensile strength and hardness. These test biscuits had tensile strengths of 205-245 psi and core hardness of 82-87, both of which are within acceptable limits for sand core and mold manufacture.

A comparative run was done using the same sand/resin composition and a catalyst consisting of benzene sulfonic acid at a 40% concentration based on weight of resin. After curing under the same temperature and same curing time as justed described, the test biscuits obtained had tensile strengths of 200-245 psi and core hardness of 82-86 after 2 hours. From this comparison, it is seen that the modification of the toluene sulfonic acid catalyst by addition of 10% perchloric acid produced an acid catalyst capable of functioning as well as benzene sulfonic acid at a 40% concentration.

EXAMPLE VIII

Sand core test biscuits were prepared following the procedure of Example VII using a liquid phenol-formaldehyde resole resin of a type that is normally cured at a substantially slower rate than the resin used in Example VII. The conditions of preparation were the same as for Example VII except for the substitution of this resin. Under these conditions test speciments were obtained having a tensile strength of 225 psi and core hardness of 82 using the perchloric acid-containing toluene sulfonic acid catalyst and a tensile strength of 230 psi and core hardness of 83 using the benzene sulfonic acid catalyst.

EXAMPLE IX

The procedure of Example VI was repeated and different catalysts used for preparation of tests speciments from reclaimed sand. In one case, the catalyst used was 50% base on weight of resin, toluene sulfonic acid modified by addition of 10% perchloric acid (70% concentration). This was prepared with a catalyst comprising 70% based on weight of resin, of a mixture of benzene sulfonic acid and toluene sulfonic acid. Under the same conditions of temperature and reaction time and at a catalyst weight concentration of 50%, the test specimens obtained were substantially equal in tensile strength and core hardness.

EXAMPLE X

A foundry grade sand was mixed with 40% of a perchloric-containing sulfonic acid catalyst. The catalyst consisted of 36% toluene sulfonic acid modified by addition of 15% perchloric acid (70% concentration). This catalyst composition mixed easily with the resin.

The sand/catalyst mixture was then mixed with a low viscosity liquid phenolic modified furan resin at a concentration of 1.25% resin based on the sand. The sand- /resin/catalyst mix was then formed into test biscuits and allowed to cure at a temperature of 78 degrees Farenheit. After curing for a period of 28 minutes, the test biscuits were set sufficiently to be handled without breaking. The test biscuits were tested after 2 hours, according to standard foundry procedures, for tensile strength and hardness. These test biscuits had tensile strength of 150 psi and core hardness of 83.

A comparative run was made using the same resin admixed with a 70% sulfonic acid catalyst (mixture of benzene sulfonic acid and toluene sulfonic acid) as used in Example IX. Otherwise, the run was the same just reported. The product obtained after the same reaction time had substantially the same tensile strength and core hardness.

EXAMPLE XI

Sand core test specimens were made using a phenolic resin as in Example VI and a catalyst consisting of 67% toluene sulfonic acid modified by addition of 10% perchloric acid (70% concentration). This was compared with a similar catalyst containing 10% sufluric acid (96% conc.) in place of the perchloric acid.

Under the same reaction conditions of temperature 80 degrees Farenheit, and reaction time, 35 minutes, and the same resin concentration (1.25%) and catalyst concentration (40%) the catalyst containing perchloric acid produced test specimens having a tensile strength of 250 psi and core hardness of 79 while the catalyst containing sulfuric acid produced test specimens having a tensile strength of 150 psi and core hardness of 62.

When a similar run was made with a catalyst consisting of toluene sulfonic acid and 20% hydrochloric acid, having same normality as 70% perchloric acid, the reaction time was 20% slower and the test specimens 20% lower in tensile strength than in a control run using the catalyst of Example VI.

When attempts were made to use a toluene sulfonic acid/nitric acid catalyst, the evolution of No. 2 was objectionable.

EXAMPLE XII

In this example a comparison was made in the setting time for a phenolic modified furan resin using a benzene/toluene sulfonic acid catalyst as in Example X and a toluene sulfonic acid catalyst modified by addition of 4% perchloric acid (70% concentration). The catalyst were used at a 30% concentration on the sand based on resin, and the sand/catalyst mix was mixed with resin at a 1.25% resin concentration based on weight of the sand. The setting times for both systems were substantially equal. The hardness and tensile strength of the test specimens were the same.

From these and other experiments, it has been determined that the addition of 0.5–20% perchloric acid (70% concentration), 3–15% perchloric acid is preferred, to catalyst consisting of benzene sulfonic acid, toluene sulfonic acid or xylene sulfonic acid or mixtures thereof produces a much more rapid cure without deleterious effect on the tensile strength and core hardness of sand cores and molds made from phenolic resins and phenolic-modified furan resins. The use of these catalysts is also effective in the curing of furfuryl alcohol-urea-formaldehyde resins, furfuryl alcohol-formaldehyde resins and furfuryl alcohol-urea-phenol-formaldehyde resins.

When sand cores or molds are made from resins cured with the perchloric acid/aromatic sulfonic acid catalyst compositions, the residue of perchloric acid in the polymerized resin is effective at pouring temperatures to oxidize the volatile organic compounds that are emitted and to reduce substantially the amount of objectable emissions.

While this invention has been described fully and completely with special emphasis upon several preferred embodiments it should be understood that within the scope of the appended claims the invention may be practiced otherwise than as specifically described herein.

We claim:
1. A catalyst composition for the polymerization of acid curable condensation-type resin binders in sand cores or molds, comprising
   a mixture consisting essentially of an aromatic sulfonic acid and 0.5–20% wt. of perchloric acid.
2. A catalyst composition according to claim 1 in which
   said aromatic sulfonic acid is benzene sulfonic acid or toluene sulfonic acid or xylene sulfonic acid or mixtures thereof.
3. A catalyst composition according to claim 2 in which said perchloric acid comprises 3–15% of the catalyst.
4. A catalyst composition according to claim 3 in which said perchloric acid is added as a 70% aqueous solution.
5. A method of preparing a catalyst composition according to claim 1 comprising
   mixing a 60–70% solution of said aromatic sulfonic acid with 0.5–20.0% wt. of a concentrated aqueous solution of perchloric acid.
6. A method according to claim 5 in which said perchloric acid is an aqueous solution of about 70% concentration.

* * * * *